Jan. 25, 1966     D. L. PLATUS ETAL     3,231,049
ENERGY ABSORBING DEVICE

Filed July 16, 1963     9 Sheets-Sheet 1

DAVID L. PLATUS
FRANK A. MAROVICH
PATRICK J. CUNNINGHAM
INVENTORS

Jan. 25, 1966 D. L. PLATUS ETAL 3,231,049
ENERGY ABSORBING DEVICE
Filed July 16, 1963 9 Sheets-Sheet 2
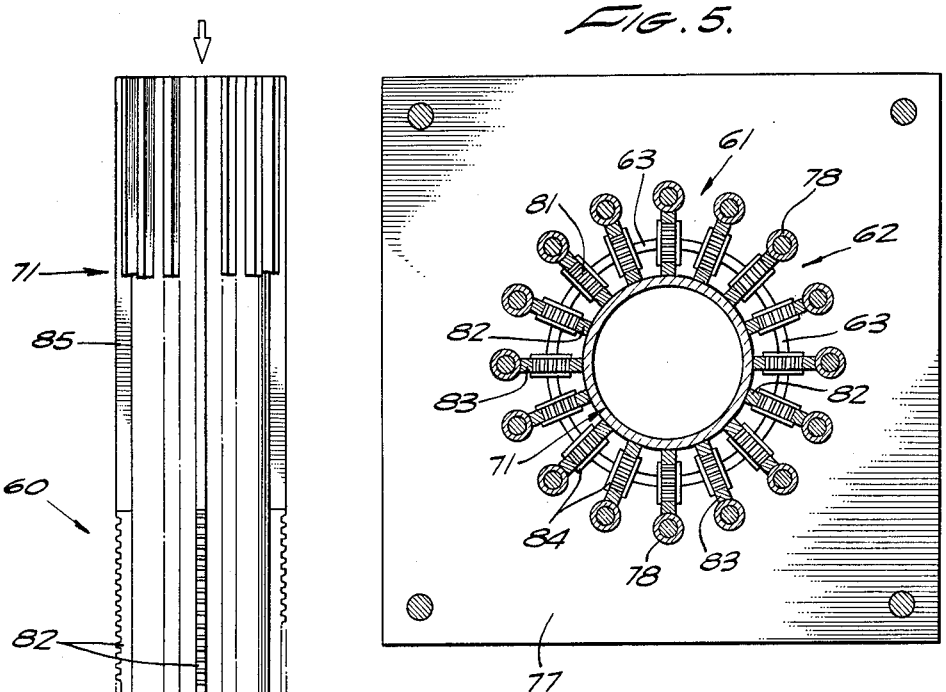
FIG. 5.
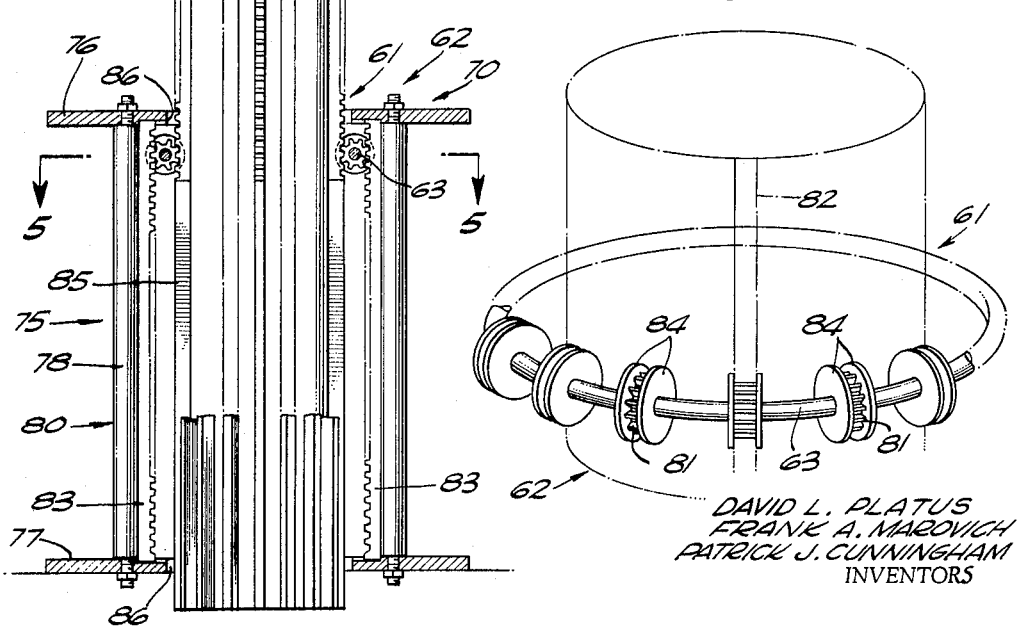
FIG. 4.
FIG. 6.
DAVID L. PLATUS
FRANK A. MAROVICH
PATRICK J. CUNNINGHAM
INVENTORS Jan. 25, 1966   D. L. PLATUS ETAL   3,231,049
ENERGY ABSORBING DEVICE
Filed July 16, 1963   9 Sheets-Sheet 3
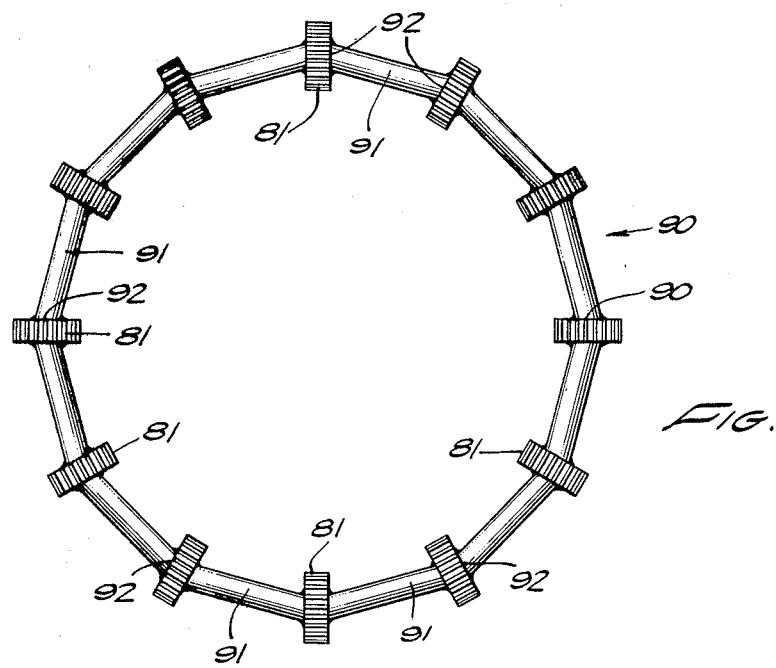
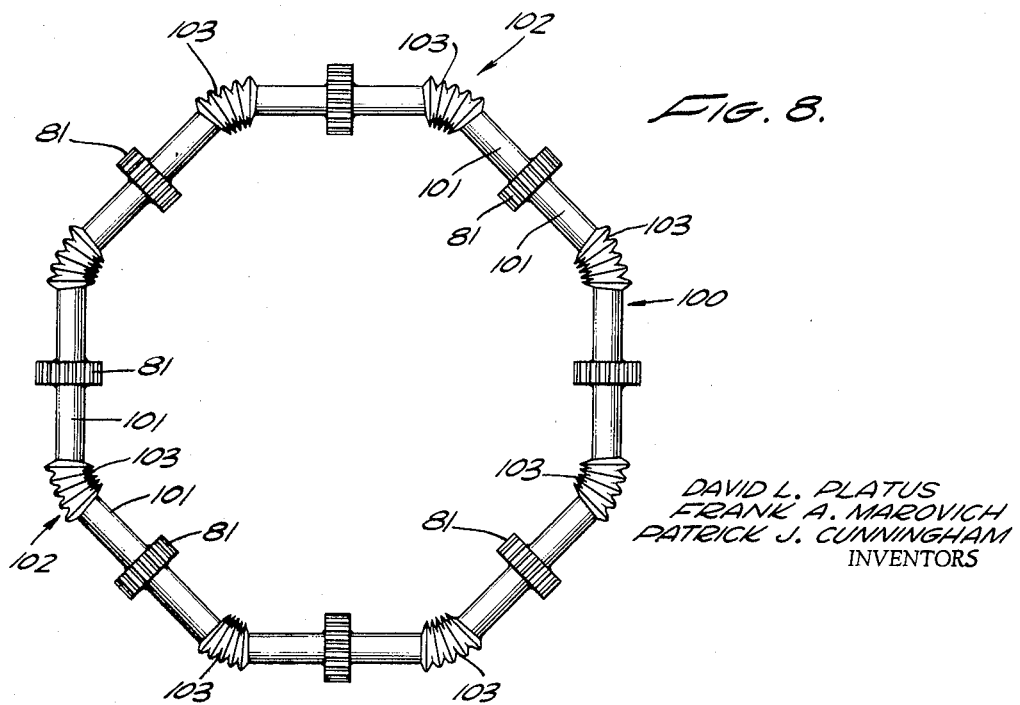
DAVID L. PLATUS
FRANK A. MAROVICH
PATRICK J. CUNNINGHAM
INVENTORS Jan. 25, 1966  D. L. PLATUS ETAL  3,231,049
ENERGY ABSORBING DEVICE
Filed July 16, 1963  9 Sheets-Sheet 4

DAVID L. PLATUS
FRANK A. MAROVICH
PATRICK J. CUNNINGHAM
INVENTORS

Jan. 25, 1966   D. L. PLATUS ETAL   3,231,049
ENERGY ABSORBING DEVICE
Filed July 16, 1963   9 Sheets-Sheet 5

DAVID L. PLATUS
FRANK A. MAROVICH
PATRICK J. CUNNINGHAM
INVENTORS

DAVID L. PLATUS
FRANK A. MAROVICH
PATRICK J. CUNNINGHAM
INVENTORS

Jan. 25, 1966  D. L. PLATUS ETAL  3,231,049
ENERGY ABSORBING DEVICE
Filed July 16, 1963  9 Sheets-Sheet 7

DAVID L. PLATUS
FRANK A. MAROVICH
PATRICK J. CUNNINGHAM
INVENTORS

Jan. 25, 1966 D. L. PLATUS ETAL 3,231,049
ENERGY ABSORBING DEVICE
Filed July 16, 1963 9 Sheets-Sheet 8

DAVID L. PLATUS
FRANK A. MAROVICH
PATRICK J. CUNNINGHAM
INVENTORS

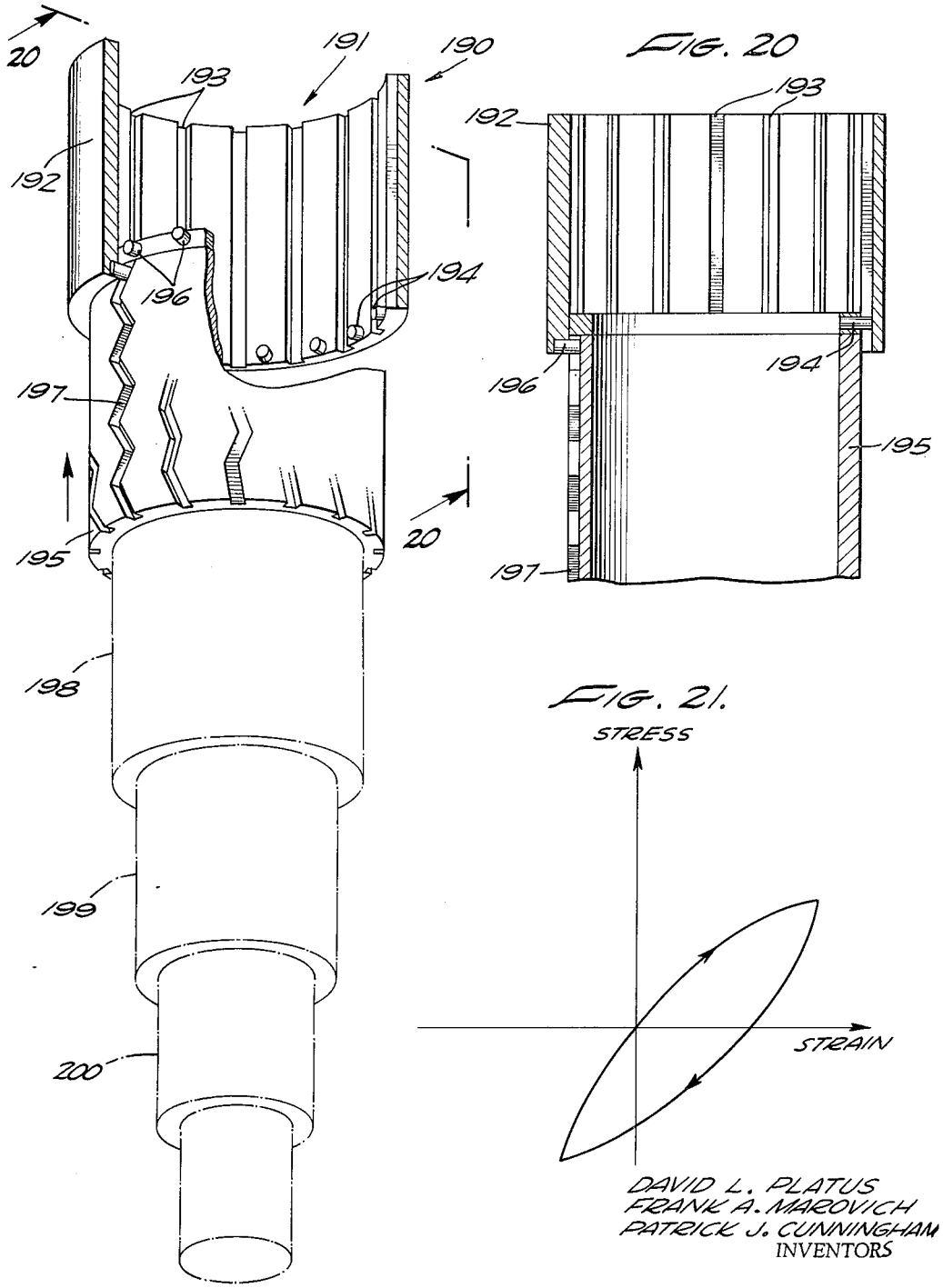

United States Patent Office 3,231,049
Patented Jan. 25, 1966

3,231,049
ENERGY ABSORBING DEVICE
David L. Platus, Covina, Frank A. Marovich, Hacienda Heights, and Patrick J. Cunningham, Fullerton, Calif., assignors to ARA, Inc. (Aerospace Research Associates, Inc.), West Covina, Calif., a corporation of California
Filed July 16, 1963, Ser. No. 295,316
9 Claims. (Cl. 188—1)

In general, the present invention relates to a lightweight, high-energy absorbing device. More particularly, the present invention relates to an energy absorbing device adapted to absorb unidirectional mechanical energy by the cyclic plastic deformation of a solid material. As used in the present application, the term "mechanical energy" may be defined according to its conventional definition, i.e., a force acting through a distance. Thus the term "mechanical energy" includes not only the kinetic energy associated with a moving body, but also the energy associated with situations, such as relieving the overload on a structure without damage to the structure. Also, as used in the present application, the term "cyclic plastic deformation" refers to the deformation of any solid material around a hysteresis curve, as illustrated in FIG. 21 discussed below, wherein a substantial amount of energy is absorbed during the course of one cycle.

At present, there are a wide variety of energy absorbing devices known which are adapted to cushion the impact of the thing being protected when it is required to bring it to a sudden stop. A common example of such energy absorbing devices are conventional hydraulic-mechanical devices, such as dashpots. However, such conventional hydraulic-mechanical energy absorbing devices are capable of absorbing relatively limited amounts of energy during a single impact and are relatively heavy, bulky devices. For example, a typical hydraulic-mechanical device now on the market has the capacity of absorbing 1000 foot pounds of energy per pound of weight during a single impact. Because of the low capacity and high weight of such conventional hydraulic-mechanical devices, energy absorbing devices have been developed which achieve very high specific energy absorption, i.e., large values of foot pounds of energy absorbed per pound of weight of the device, but such devices usually require their substantial destruction during the course of a single impact. The most efficient such single impact energy absorption device now known is probably the frangible tube device having a specific energy absorption of about 30,000 foot pounds per pound, although similar devices, such as crushable materials and gas-filled collapsible shells are known. However, such single impact devices have only very limited usefulness because they require replacement after usually one use and thus are not suitable in any situation which would require several impacts.

In general, therefore, an object of the present invention is a lightweight, high-energy absorbing device which may be utilized to cushion a substantial number of impacts.

Another object of the present invention is an energy absorbing device adapted to absorb unidirectional mechanical energy by cyclic plastic deformation of solid materials.

Still another object of the present invention is an energy absorbing device wherein the cyclic plastic deformation includes substantially tension deformation and compression deformation or substantially torsion deformation and reverse torsion deformation or a combination of such deformations.

Still another object of the present invention is an energy absorbing device which includes a cycling and energy absorbing means which comprises at least a section of a toroidal member.

Other objects and advantages of the present invention will be readily apparent from the following description and drawings which will illustrate at least one preferred exemplary embodiment of the present invention.

In general, the present invention involves an energy absorbing device which comprises an energy absorbing means and an energy transmitting means for imposing on such energy absorbing means a deformation and its reverse deformation in response to mechanical energy applied thereto. Operatively associated with both of said means is a cycling means for converting unidirectional mechanical energy applied to said energy transmitting means into cyclic plastic deformation and its reverse deformation of said energy absorbing means. At least two of said means may be combined into a single means for performing all of the functions of each of said means being combined.

In order to facilitate understanding of the present invention, reference will now be made to the appended drawings of a preferred specific embodiment of the present invention. Such drawings should not be construed as limiting the invention which is properly set forth in the appended claims.

In the drawings:
FIG. 1 is a perspective view of an apparatus incorporating a specific embodiment of the energy absorbing device of the present invention.

FIG. 4 is a cross-sectional elevational view of another embodiment of the energy absorbing device of the present invention.

FIG. 5 is a cross-sectional view of FIG. 4 taken along the lines 5—5 of FIG. 4.

FIG. 6 is a perspective view of a portion of FIG. 4.

FIG. 7 is a plan view of another embodiment of a portion of the energy absorbing device illustrated in FIG. 4 wherein the torus is replaced by a toroidal member formed from a series of cylindrical members having symmetrical truncated ends.

FIG. 8 is a plan view of still another embodiment of a portion of the energy absorbing device illustrated in FIG. 4 wherein the torus is replaced by a toroidal member comprising a series of cylindrical members attached at their adjacent ends by flexible joint means.

FIG. 16 is a cross-sectional view of FIG. 15 taken along the lines 16—16 of FIG. 15, while

FIG. 19 is a perspective view partially broken away of still another embodiment of the present invention.

FIG. 20 is a cross-sectional view of FIG. 19 taken along the lines 20—20 of FIG. 19.

FIG. 21 is a graphical sketch illustrating the basic principle of the present invention.

Figure 1:
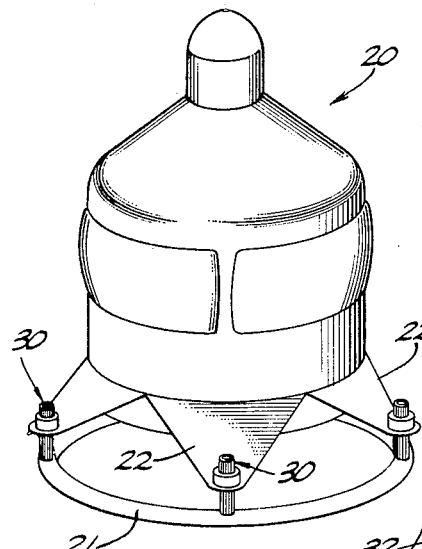
Figure 2:
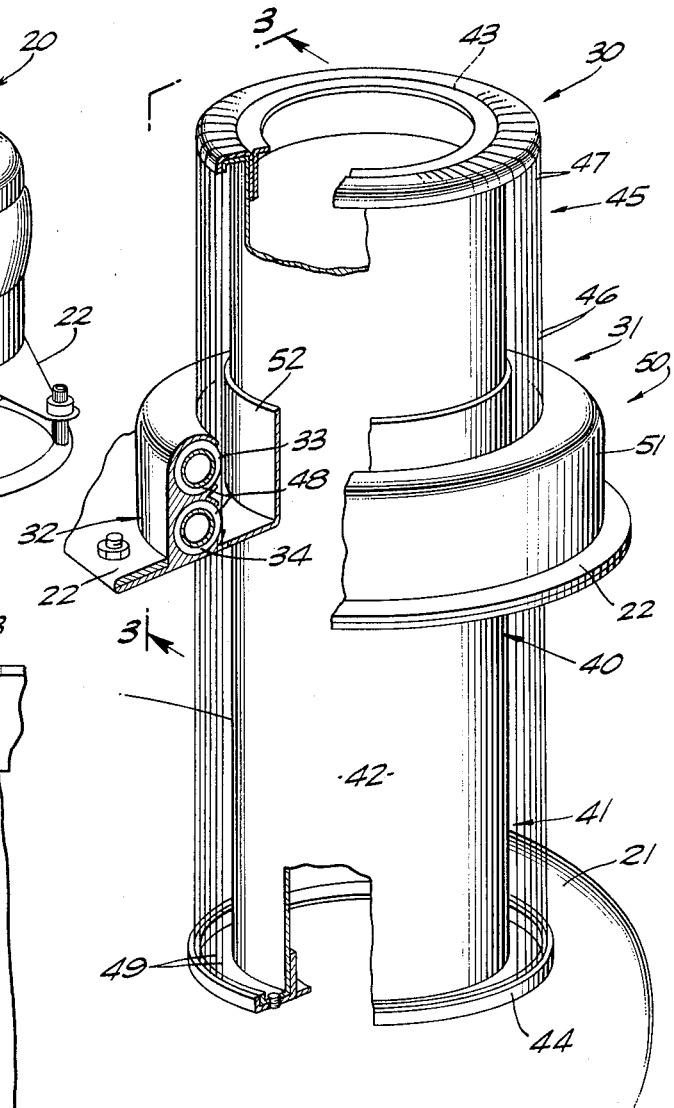
FIG. 2 is an enlarged perspective view partially broken away of the energy absorbing device portion of FIG. 1.
Figure 3:
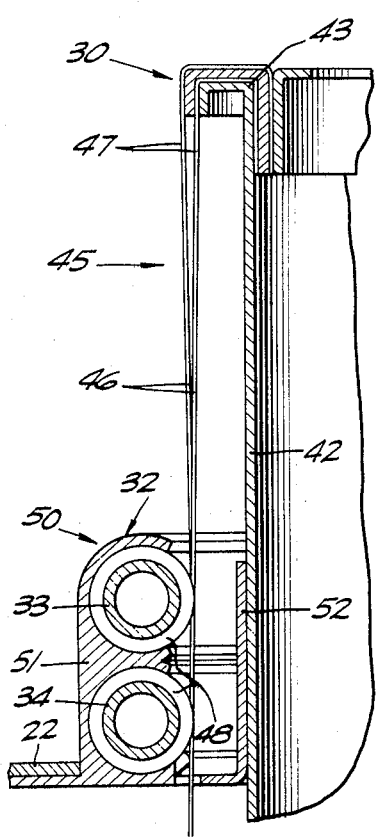
FIG. 3 is a cross-sectional view of FIG. 2 taken along the lines 3—3 of FIG. 2.

As illustrated in FIGS. 1-3, the preferred embodiment of the present invention involves energy absorbing devices 30 which are used to cushion an instrument package 20 having a base ring 21 and a series of legs 22 which are connected to the base ring 21 by means of energy absorbing devices 30. The energy absorbing devices 30 include, generally, a cycling and energy absorbing means 31 and an energy transmitting means 40. The energy transmitting means 40 imposes on the cycling and energy absorbing means 31 a deformation and its reverse deformation in response to kinetic energy applied thereto. The cycling and energy absorbing means 31 is adapted to convert unidirectional kinetic energy applied to the energy transmitting means 40 into its cyclic plastic deformation and reverse deformation. The cycling and energy absorbing means 31 comprises a toroidal member 32 consisting essentially of a pair of tori 33 and 34. The energy transmitting means 40 comprises a column means 41 which is movable and coaxial with respect to the toroidal member 32. Between the column means 41 and the toroidal member 32 are connecting means 45 for rotating the toroidal member 32 by movement of the column means 41. Holding the toroidal member 32 and maintaining it in alignment with the column means 41 is a support means 50. The column means 41 comprises simply a tube 42 which is connected directly to the base ring 21 of the instrument package 20. Similarly, the support means 50 comprises simply a housing 51 which is joined to the legs 22 of the instrument package 20 and in which the tori 33 and 34 are loosely positioned. In addititon, the support means 50 includes a sleeve 52 for maintaining the alignment of a column 41 with respect to the toroidal member 32. The tube 42 is slidably mounted in the sleeve 52 of the support means 50.

The connecting means 45 comprises a series of cords 46 spaced around the circumference of the toroidal member 32. Each of the cord 46 has its first end 47 attached to the free end 43 of the tube 42, its central portion 48 wound around at least one of the tori 33 or 34, and its second end 49 attached to the connected end 44 of the tube 42. Each cord 46 simply grasps the torus 33 or 34 by a capstan action.

When the instrument package 20 strikes the ground, the base ring 21 is jolted towards the legs 22. Such impact is translated through the tubes 42 along the cords 46 to tori 33 and 34 to the housing 51. However, in the course of such translation of the impact, the cords 46 cause the tori 33 and 34 to rotate about their internal axes as the cords 46 concurrently wind onto and unwind therefrom. Such concurrent winding and unwinding action of the cords 46 result in the portion 48 of the cords 46 wound around the torus 33 or 34 being moved from the first end 47 of the cords 46 to the second end 49 of the cords 46. The rotation of the tori 33 and 34 causes cyclic plastic tension deformation and compression deformation thereon and thus results in an absorption of energy which increases the temperature of the tori 33 and 34.

A design analysis was carried out for a landing impact system, as illustrated in FIGS. 1-3, which was adapted to decelerate a 7,000-pound vehicle from an impact velocity of 32.8 feet per second, with an average deceleration of 10 G. As illustrated, four energy absorbing devices were utilized so that an impact force of 17,500 pounds per device was required. It should be noted that the impact velocity was selected to give a stroke length of 20 inches, i.e., movement of the tube 41 with respect to the housing 51 is approximately 20 inches.

For simplicity, the system was designed for a single impact with the tori revolving through 20 cycles and rising about 1000° F. in temperature during the impact. A list of the design parameters for each component was set up as follows:

347 Stainless steel torus tubes:

| | | |
|---|---|---|
| Tube diameter | in | 0.30 |
| Average radius of the torus | in | 1.80 |
| Tube wall thickness | in | 0.048 |
| Fatigue parameter, C (550° F. average temperature) | | 0.75 |
| Average flow stress | p.s.i | 53,000 |
| Specific weight | p.c.i | 0.29 |
| Heat capacity | B.t.u./lb.°F | 0.12 |
| Total weight of the two tori | lb | 0.297 |

Aluminum alloy column:

| | | |
|---|---|---|
| Length | in | 20 |
| Radius | in | 1.60 |
| Wall thickness | in | 0.0266 |
| Yield strength | p.s.i | 78,000 |
| Young's modulus, E | p.s.i | $10.6 \times 10^6$ |
| Critical strength | p.s.i | 65,300 |
| Specific weight | p.c.i | 0.10 |
| Total weight | lb | 0.535 |

Steel cords:

| | | |
|---|---|---|
| Yield strength | p.s.i | 400,000 |
| Specific weight | p.c.i | 0.30 |
| Total weight | lb | 0.263 |

For the column design, Euler's equation was used for simplicity with the assumptions: (1) the proportional limit is ¾ of the yield strength, and (2) the slenderness ratio to reach yield is ⅔ that required to reach the proportional limit. A safety factor of 1.25 was applied to the above weights in order to arrive at a more realistic design value. The weight breakdown on such basis is as follows:

| | |
|---|---|
| Working elements | lb 0.371 |
| Column | 0.669 |
| Steel cords | 0.328 |
| Sleeve bearings and attachment | 0.371 |
| Total | lb 1.74 |

The total impact energy for a single energy absorbing device as described above is 29,200 ft-lb, giving a total specific energy absorption for the device, i.e., $$\frac{29,200}{1.74} = 16,800 \text{ ft.-lb./lb.}$$

The total weight of the four devices which make up the impact system, excluding the weight of attachments, is 7 lbs. or 0.1% of the vehicle weight.

Another embodiment of the present invention is illustrated in FIGS. 4-6. In FIGS. 4-6, the energy absorbing device 60 again includes a cycling and energy absorbing means 61 comprising a toroidal member 62. Toroidal member 62 consists essentially of simply a torus 63. The energy transmitting means 70 includes a column means 71 which is movable and coaxial with respect to the toroidal member 62. The toroidal member 62 is held by a support means 75 which maintains the alignment of the column means 71 and the toroidal member 62. The support means 75 includes an upper support plate 76 and lower support plate 77 having a series of posts 78 connected therebetween and spaced around the circumference of the column means 71. Between the column means 71 and the support means 75 and the torus 63 are connecting means 80 for rotating the torus 63 by movement of the column 71. The connecting means 80 comprise a series of pinion gears 81 mounted coaxially on and spaced around the torus 63. A series of corresponding column racks 82 are mounted on and spaced around the column 71. Similarly, a coresponding series of support racks 83 is mounted on the posts 78 of the support means 75. Each of said racks is engaged with a corresponding pinion gear 81. Alignment of the pinion gears 81 with the racks 82 and 83 is insured by the flanges 84 on the sides of each pinion gear 81. Similarly, the extensions 85 of the column racks 82 are slidably received in notches 86 in the plates 76 and 77 to keep the column 71 properly aligned with respect to the support means 75.

The operation of the energy absorbing device illustrated in FIGS. 4–6 is substantially the same as that set forth above for the energy absorbing device illustrated in FIGS. 1–3. Thus, the column 71 is moved with respect to the support means 75 and the torus 63 is rotated about its internal axis and causes cyclic plastic tension deformation and compression deformation to absorb energy.

A test device as illustrated in FIGS. 4–6 was built and operated to obtain some experimental values of specific energy absorption. In such device, a solid OFHC copper torus with a 2.4 in. major diameter and minor diameter of 0.095 in. over the working section and 0.125 in. at the gears was utilized. The torus 63 had mounted thereon sixteen brass spur gears 81 having a ⅛-inch face and a diametrical pitch of 64. The gears meshed at their inner periphery with sixteen brass racks soldered to a 2-inch brass tube. The gears meshed at their outer periphery with racks mounted on sixteen copper tubular posts bolted between two aluminum end plates which also served to guide the central tube. Such device was initially tested to find the force required to move the central tube and such force was found to be approximately 200 pounds. Subsequently, a 27-lb. weight was dropped onto the device from various heights and the resulting stroke of the tube was recorded. Typical drop tests involved a height of drop of 18 inches. The total energy imparted to the energy absorbing device in the structural tester and in the first five drops was approximately 253 ft.-lbs. Assuming an average frictional force of 20 lbs. with a total stroke length of 1.15 ft., the total energy absorbed by the working metal was 230 ft.-lbs. Approximately 23 ft.-lbs. was assumed to be imparted to the test structure apart from the working metal. For the 0.0373 cubic inch of working metal having a specific weight of 0.322 p.c.i., the experimental valve of specific energy absorption was 19,200 ft.-lbs. It should be noted that by the time of the second drop one of the working sections failed and after five drops approximately seven working sections had failed. However, such device was still able to continue to absorb energy because of the remaining nine working sections which were in good shape. Thus, the design exhibited a substantially fail-safe result, since sixteen independent working sections would have to fail before there was a complete lack of energy absorption.

In FIG. 7, alternate toroidal member 90 is illustrated which could be utilized in place of the toroidal member 62 of FIGS. 4–6. The toroidal member 90 includes a series of cylindrical members 91, each having symmetrical truncated ends 92. The cylindrical members 91 are connected to form a substantially toroidal member by connecting their ends 92 to the pinion gears 81. The toroidal member 90 operates in the same fashion as the toroidal member 62 in causing cyclic plastic tension deformation and compression deformation as such member is rotated.

In FIG. 8, an alternate toroidal member 100 is illustrated wherein the cylindrical members 101 are connected at one end to pinion gears 81 and connected at their adjacent ends of flexible joint members 102. As illustrated, the flexible joint means 102 comprises bellows 103. Such construction of the toroidal member 100 permits control of the displacement of the ends of the cylindrical members. Consequently, the plastic strain range can be controlled during the operation of the device. Thus, by adjusting the angle of the bend and the stiffness of the flexible joint means, such as bellows or springs, the amount of plastic deformation per cycle can be controlled. In this way, a larger diameter tube can be utilized having more working material, but is utilized over a smaller plastic strain range per cycle. As illustrated in the foregoing discussion, the term "toroidal member" as used in the present application refers to any member which when rotated about its internal axis cause alternating or cyclic tension and compression of its longitudinal fibers. For example, as shown, the toroidal member may be simply a curved member, such as a section of a torus, or a straight member, such as a cylinder having truncated ends. However, it may involve more complicated shapes, such as an S-shaped curved member or a straight member connected by flexible joints.

Figure 9:
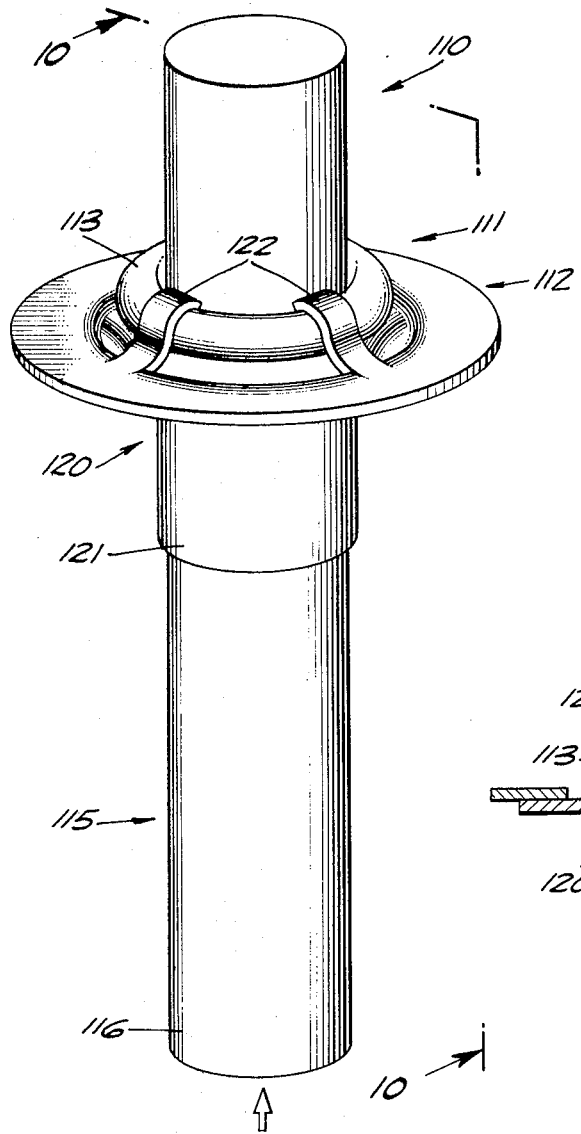
FIG. 9 is a perspective view of another embodiment of the energy absorbing device of the present invention.
Figure 10:
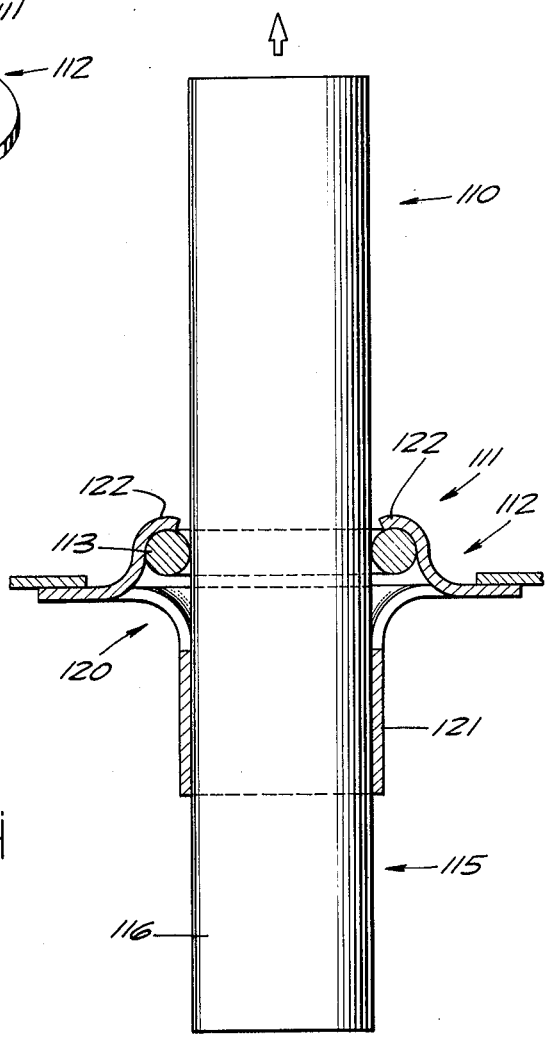
FIG. 10 is a cross-sectional view of FIG. 9 taken along the lines 10—10 of FIG. 9.

Another embodiment of the energy absorbing device of the present invention is illustrated in FIGS. 9 and 10. The energy absorbing device 110 illustrated in FIGS. 9 and 10 involves again a cycling and energy absorbing means 111 comprising a toroidal member 112 consisting essentially of a torus 113. The energy transmitting means 115 comprises a column means 116 movable and coaxial with respect to the toroidal member 112. Holding the toroidal member 112 is a support means 120 which maintains the alignment of the column 116 with the toroidal member 112. A support means 120 includes a sleeve 121 in which the column 116 is slidably mounted and a series of arms 122 spaced around the circumference of the torus 113 and which rotatably hold the torus 113. The connecting means between the column 116 and the toroidal member 112 for rotating the toroidal member and movement of the column 116 consists of simply the frictional engagement between the column 116 and the toroidal member 113.

Figures 11, 12:
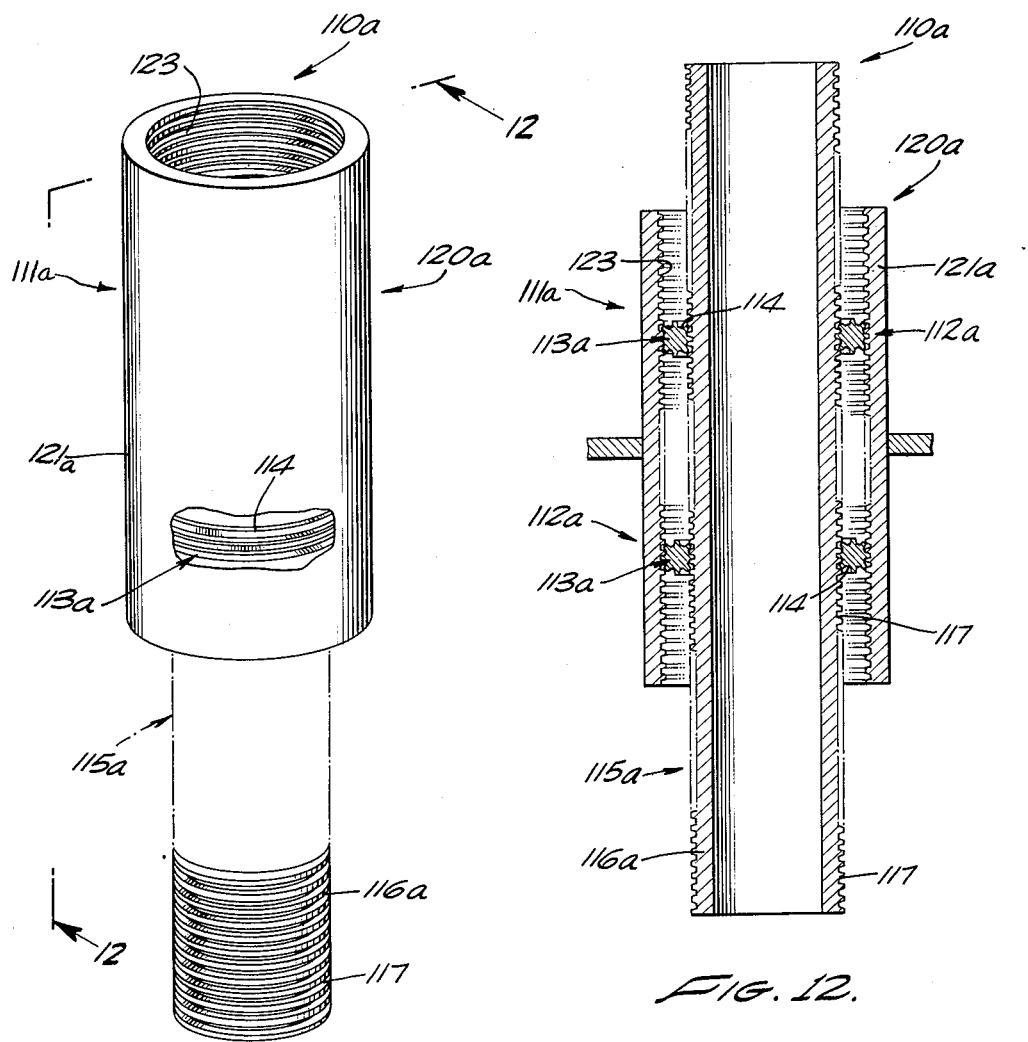
FIG. 11 is a partially broken away perspective view of another embodiment of the energy absorbing device of the present invention.
FIG. 12 is a cross-sectional view of FIG. 11 taken along the lines 12—12 of FIG. 11.

Another embodiment of the present invention is illustrated in FIGS. 11 and 12 which is similar to the embodiment illustrated in FIGS. 9 and 10. In FIGS. 11 and 12 the energy absorbing device 110a includes a cycling and energy absorbing means 111a comprising a toroidal member 112a consisting essentially of tori 113a having circumferential ridges 114. The energy transmitting means 115a comprises a column means 116a movable and coaxial with respect to the toroidal member 112a. The column 116a has circumferential grooves 117 adapted to engage the ridges 114 of the tori 113a. A support means 120a is external to and coaxial with the toroidal member 112a. The support means 120a includes a sleeve 121 having internal circumferential grooves 123 adapted to engage the ridges 114 of the tori 113a. A support means 120a is external to and coaxial with the toroidal member 112a. The support means 120a includes a sleeve 121a having internal circumferential grooves 123 adapted to engage the ridges 114 of the tori 113a. Thus, when the column means 116a is moved with respect to the sleeve 121a, the tori 113a are rotated about their internal axes due to the engagement of their ridges 114 with the grooves 117 and 123 of the column 116a and sleeve 121a.

Figure 13:
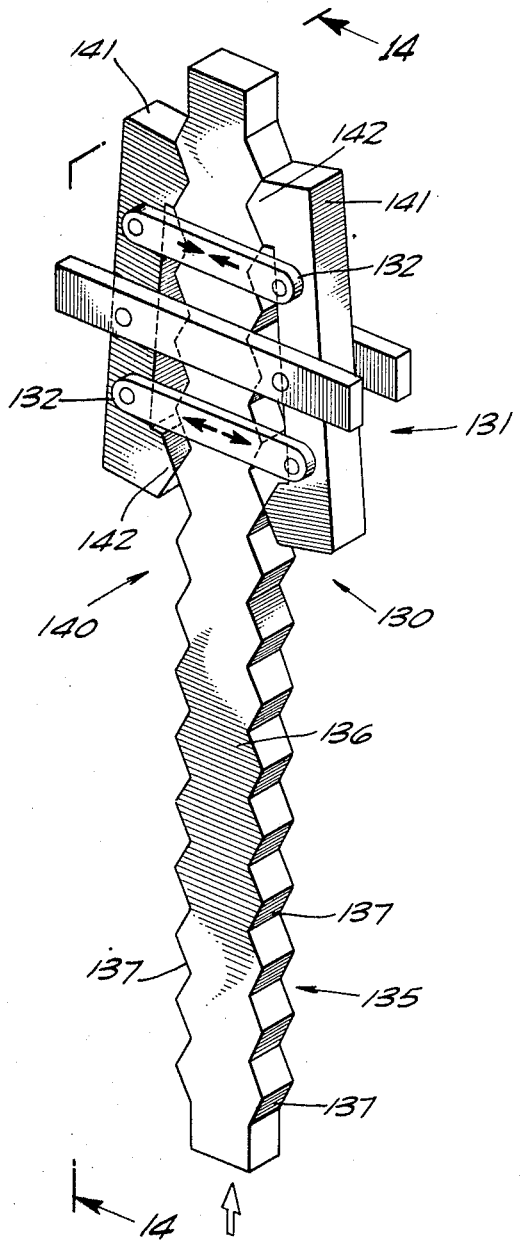
FIG. 13 is a perspective view of another embodiment of the energy absorbing device of the present invention.
Figure 14:
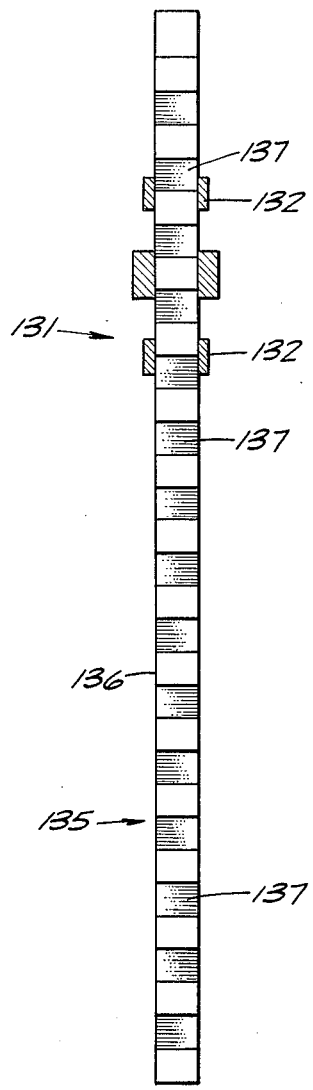
FIG. 14 is a cross-sectional view of FIG. 13 taken along the lines 14—14 of FIG. 13.

Another embodiment of the present invention is illustrated in FIGS. 13 and 14. In FIGS. 13 and 14 the energy absorbing device 130 comprises an energy absorbing means 131 comprising a set of straps 132. The energy transmitting means 135 comprises a column 136 having a series of serrations 137. The cycling means 140 comprises a pair of rocker arms 141 connected to the ends of the straps 132 and engaged with the column serrations 137 of the column 136 by means of teeth 142. The rocker arms 141 are adapted to move along the axis of the column 136 and to impose cyclic plastic tension deformation and compression deformation on the straps 132 during such movement.

Figure 15:
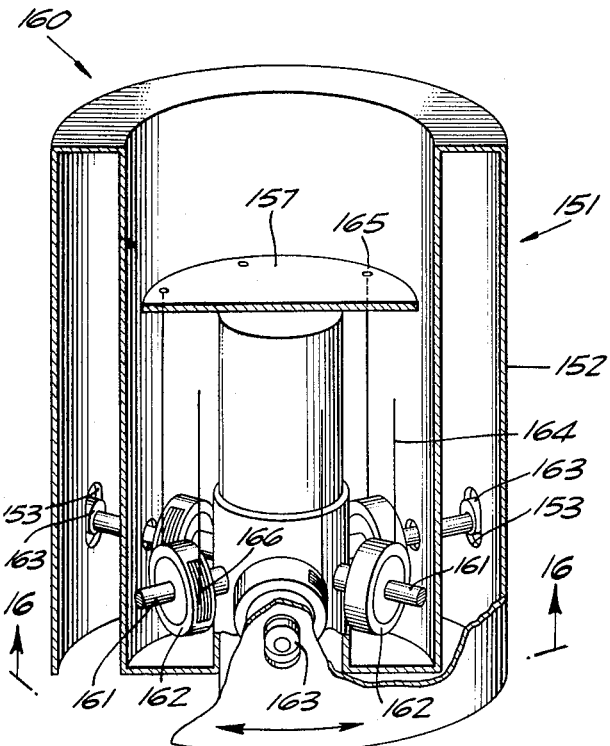
FIG. 15 is a perspective view partially broken away of another embodiment of the energy absorbing device of the present invention.
Figure 16A:
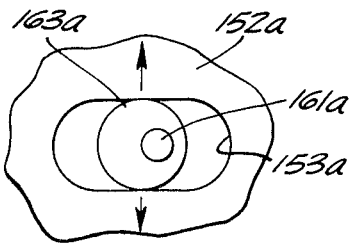
FIGS. 16a and 16b show alternate embodiments of a portion of the device illustrated in FIG. 15.
Figure 16B:
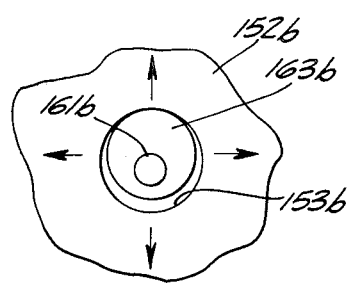
Figure 16:
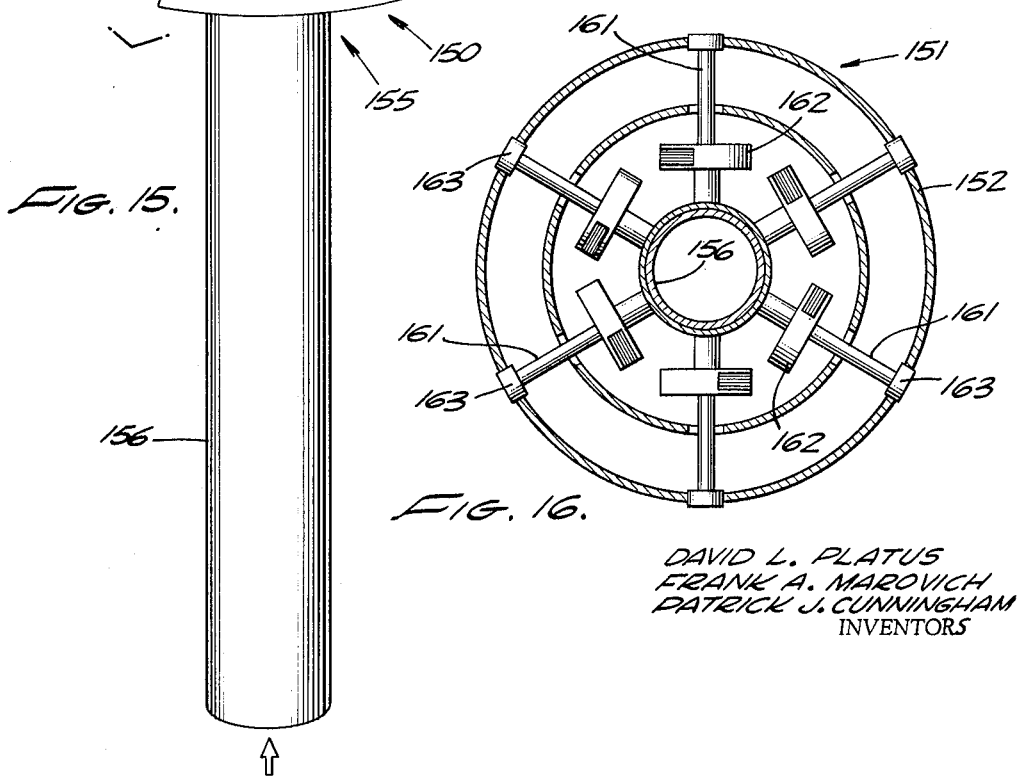

Another embodiment of the present invention is illustrated in FIGS. 15 and 16 with alternate embodiments of a portion of the device illustrated in FIGS. 16a and 16b. As illustrated, the energy absorbing device 150 includes an energy absorbing means 151 and an energy transmitting means 155 for imposing on said energy absorbing means substantial tension deformation and compression deformation or torsion deformation and reverse torsion deformation or a combination of said deformations in response to mechanical energy applied thereto. A cycling means 160 converts unidirectional mechanical energy applied to the energy transmitting means 155 into cyclic plastic deformation of the energy absorbing means 151.

The energy absorbing means 151 comprises at least one shaft 152. The energy transmitting means comprises a column 156 substantially parallel and adjacent to the shaft 152. As illustrated, shaft 152 consists of a tube with the column 156 coaxially mounted therein. The cycling means 160 comprises a series of rods 161 rotatably mounted between the shaft 152 and the column 156. Each of the rods 161 has a spool 162 and a cam 163 coaxially mounted thereon. The cycling means 160 also includes cords 164 having their first end 165 attached to the free end 157 of the column 156 and having their second end 166 wound around the spool 162. The cam 163 is rotatably mounted in a slot 153 in the shaft 152. As illustrated in FIG. 15, the slots 153 and cam 163 are adapted to impose on the shaft 152 cyclic plastic torsion deformation and reverse torsion deformation by the rotation of the cam 163 in the slot 153. However, as illustrated in FIG. 16a, by utilizing a slot 153a cyclic plastic tension deformation and compression deformation is produced by the rotation of the cam 163a in the slot 153a. Also, as illustrated in FIG. 16b, by utilizing a slot 153b both cyclic plastic tension deformation and compression deformation and torsion deformation and reverse torsion deformation are produced by the rotation of the cam 163b in the slot 153b.

Figure 17:
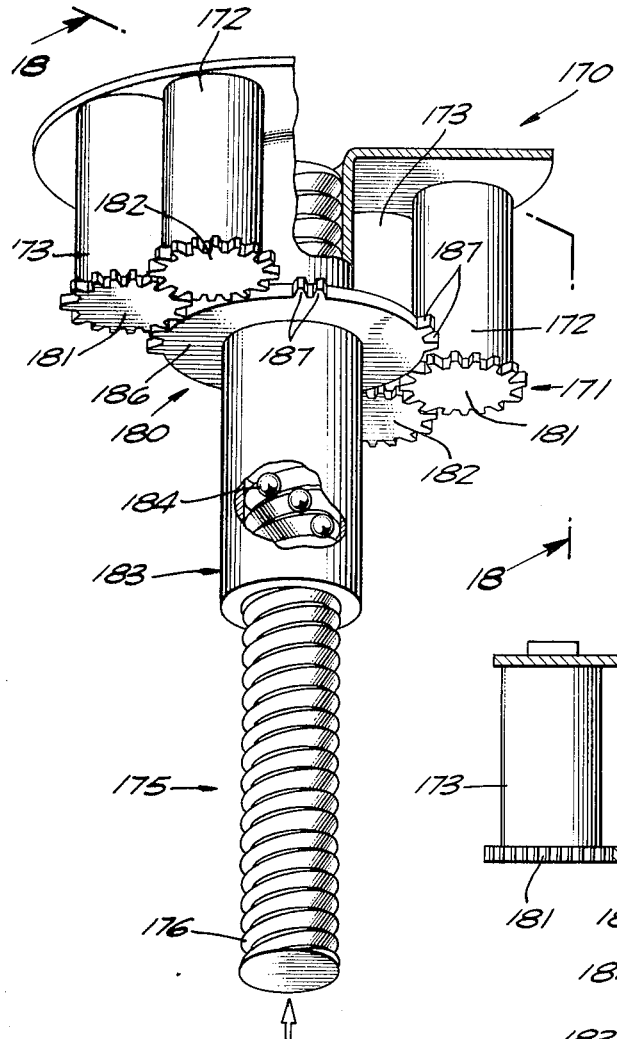
FIG. 17 is a perspective view partially broken away of still another embodiment of the present invention.
Figure 18:
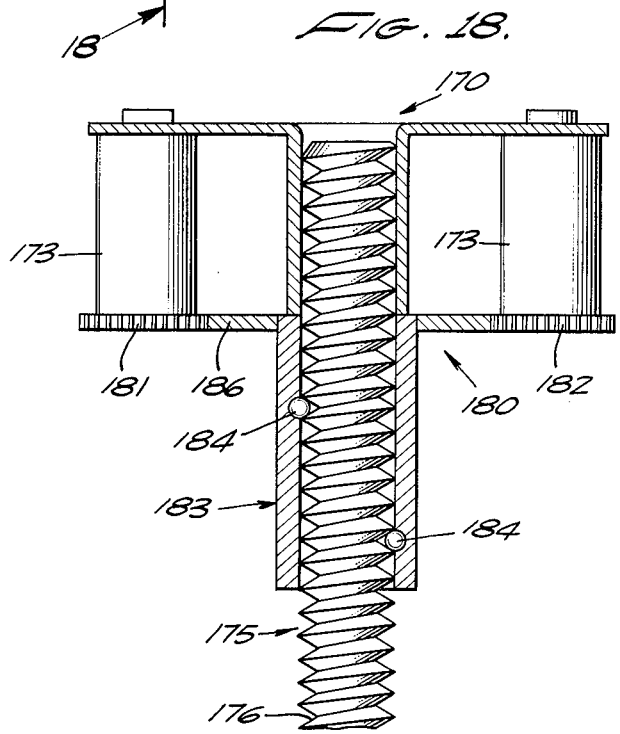
FIG. 18 is a cross-sectional view of FIG. 17 taken along the lines 18—18 of FIG. 17.

Another embodiment of the present invention is illustrated in FIGS. 17 and 18. In FIGS. 17 and 18, the energy absorbing device 170 includes an energy absorbing means 171 comprising a series of pairs of shafts 172 and 173 with each pair of shafts 172 and 173 mounted substantially parallel and adjacent to each other. The energy transmitting means 175 comprises a screw threaded column 176 mounted substantially parallel and adjacent to the pairs of shafts 172 and 173. The cycling means 180 comprises pinion gears 181 and 182 coaxially mounted on the shafts 172 and 173, respectively, with said pinion gears being mutually engaged. Rotatably mounted on and engaged with the column 176 is a nut 183 which is engaged with the column 176 by means of a set of ball bearings 184. Coaxially mounted on the nut 183 is a skip tooth gear 186 which is adapted to be engaged in series with the pinion gears 181 and 182. The pinion gears 181 and 182 with the skip tooth gear 186 are adapted to impose on the shafts 172 and 173 cyclic plastic torsion deformation and reverse torsion deformation by the rotation of the nut 183 on the column 176. Such cycling is achieved by having spaced sets of teeth 187 on the skip tooth gear 186 engage first the pinion gear 181 during the clockwise rotation of the skip tooth gear 186. Such engagement causes the pinion gear 181 to rotate in a counterclockwise direction and the mutually engaged pinion gear 182 to rotate in a clockwise direction. When the teeth 187 on the skip tooth gear 186 leave the pinion gear 181 and engage the pinion gear 182, then the rotation of the pinion gear 182 is reversed to rotate in a counterclockwise direction and the pinion gear 181 is also reversed and rotates in a clockwise direction. Thus, during each movement a set of teeth 187 pass a pair of pinion gears 181 and 182 and a cycle of torsion deformation and reverse torsion deformation on the shafts 172 and 173 is accomplished.

Another embodiment of the present invention is illustrated in FIGS. 19 and 20. In FIGS. 19 and 20, the energy absorbing device 190 combines the cycling, energy absorbing and energy transmitting means in a single structure 191. Such structure comprises at least a first tube 192 having a series of internal, substantially parallel longitudinal grooves 193 spaced around its circumference and a series of inwardly projecting lugs 194 spaced around its circumference. A second tube 195 is coaxially mounted at least partially within the first tube 192. The second tube 195 has a series of externally projecting pins 196 spaced around its circumference corresponding to the first tube internal grooves 193 with the pins 196 being slidably received in the first tube internal grooves 193. Also, the second tube 195 has a series of external longitudinal grooves 197 spaced around the circumference corresponding to the first tube lugs 194, and said first tube lugs 194 are slidably received in the second tube external grooves 197. The second tube external grooves 197 form a zigzag pattern which is adapted to impose on the first and second tubes 192 and 195 cyclic plastic torsion deformation and reverse torsion deformation by the insertion of the second tube 195 into the first tube 192. A series of additional tubes 198, 199 and 200 are telescopically received in each other and the first and second tubes 192 and 195 in a similar fashion so that the whole series of tubes is alternately subjected to torsion deformation and reverse torsion deformation when the telescope is collapsed.

As set forth above, the energy absorption device of the present invention includes an energy absorbing means which is subjected to cyclic plastic deformation and reverse deformation. Thus, any deformable solid material which exhibits a hysteresis curve, as illustrated in FIG. 21, may be utilized in the present invention. In FIG. 21 the area enclosed within the hysteresis curve loop represents the energy absorbed during the course of one cycle of cyclic plastic deformation. The materials which may be used in the present invention include not only metals, such as steel, copper, titanium, brass, etc., but also nonmetals, such as plastics, natural and synthetic rubbers and elastomers of various kinds, such as polyurethane elastomers. In fact, analysis indicates that non-metals, such as polyurethane elastomers, would be a superior energy absorbing means compared to metal, such as titanium, at least when a moderate number of impacts is involved, such as ten or more. In addition, non-metallic material, such as plastics and rubbers, offer the further advantage of large deformations with lower stresses. Thus, stability problems can be reduced and the strength and weight of redundant structures can be reduced.

Many other specific embodiments of the present invention will be obvious to one skilled in the art in view of this disclosure. For example, the energy absorbing means may utilize a tube structure, but a rod structure may be preferred since it includes increases of the weight of working material which can be utilized in a given space. Similarly, a variety of energy transmitting means and cycling means may be utilized. Thus, in the embodiment of the invention illustrated in FIGS. 4–6, a multiplying gear arrangement could be used to multiply the number of rotations possible with a fixed stroke or column length and a fixed gear tooth size. Similarly, although cams and spools have been used in the illustrated embodiments, any mechanical means which converts linear motion into oscillatory motion may be used in the present invention. For example, a rack and pinion may be used in place of the spool. Also, although the unidirectional energy absorption involving in the present invention is customarily the energy associated with linear motion, angular motion can equally well be absorbed by cyclic plastic deformation of solid material, such as metals and non-metals, in other specific embodiments of the present invention.

In addition, it should be noted that the embodiments of the present invention illustrated in FIGS. 1–2 can easily be reset although the specific mechanism therefor has not been illustrated. Thus, the embodiments illustrated in FIGS. 1–14, 17 and 18 may be reset merely by separating them from the apparatus, turning them upside down and then re-attaching them to the apparatus. Although such resetting can be done manually, it may also be done mechanically by conventional devices, such as trunnions, combined with suitable devices for maintaining the desired position of the embodiment. The remaining embodiments may be reset by disassembly or other suitable means.

Finally, it should be noted that the present invention may be utilized to relieve the overload on a structure without damage to the structure. For example, one of the illustrated embodiments may be inserted in a length of cable and designed so that its "threshold force" exceeds the normal load which the cable should carry. By "threshold force" applicant refers to the force required to initiate movement of the support means with respect to the energy transmitting means. When the load exceeds such force, the device permits the cable to lengthen a substantial distance but still maintain its integrity. Thus, the present invention may involve movement for a substantial distance under a constant load. After the cable has lengthened to such extent, then other means may be employed to support the increased load.

There are many features in the present invention which clearly show the significant advance the present invention represents over the prior art. Consequently, only a few of the more outstanding features will be pointed out to illustrate the unexpected and unusual results obtained by the present invention. One feature of the present invention involves the cyclic plastic deformation and reverse deformation, such as tension deformation and compression deformation or torsion deformation and reverse torsion deformation or a combination thereof. Such deformation results in the substantially uniform straining of the various portions of the solid working material over relatively small amplitudes of strain. Thus, strain concentrations and instabilities are substantially minimized and the working life of the solid material until failure is greatly prolonged. Another feature of the present invention is that the utilization of cyclic plastic deformation achieves very high energy absorption using a lightweight working material. Thus, the specific energy absorption of the present invention is very high. Another feature of the present invention is that it may be utilized for a substantial number of impacts. By designing the energy absorbing device of the present invention to absorb smaller amounts of energy per plastic deformation cycle and utilizing a larger number of cycles to the failing point of the working material, substantially larger total energy absorption may be achieved. Thus, in general, the larger number of cycles through which the working material is projected, the higher the energy absorption that is obtained. Still another feature of the present invention is the utilization of a toroidal member as both the energy absorbing device and the cycling means of the present invention. Thus, all of the functions of such two means can be performed simultaneously in a relatively simple, single structure. Still another feature of the present invention is the utilization of a plurality of connecting means, such as gears, rods, cords or frictional forces between the energy absorbing toroidal means and the energy transmitting means. With such arrangement, though many portions of the toroidal means may fail due to fatigue or some other reason, the energy absorbing device as a whole still retains a substantial energy absorbing potential because the remaining portions of the toroidal means operate independently. Still another feature of the present invention is that energy absorption is achieved with a relatively simple, inexpensive device which has a high reliability in operation and requires substantially no maintenance. Thus, the present invention may be employed as a safety device which can be installed and then ignored, but which is ready to operate when an emergency occurs. Still another feature of the present invention is that it permits regulation of load deflection or deceleration time behavior merely by proper design of the device. For example, when used as a cable safety device, the present invention does not operate until a predetermined threshold force is reached and then it moves through a large stroke under constant force. Also, when used as a deceleration device, the resisting force of the device is relatively independent of the impact velocity.

It will be understood that the foregoing description and examples are only illustrative of the present invention and it is not intended that the invention be limited thereto. All substitutions, alterations and modifications of the present invention which come within the scope of the following claims or to which the present invention is readily susceptible without departing from the spirit and scope of this disclosure are to be considered part of the present invention.

We claim:
1. A lightweight, high-energy absorbing device adapted to absorb unidirectional mechanical energy by cyclic plastic deformation, comprising:
   (a) a non-elastomeric toroidal cycling and energy absorbing means comprising a cylindrical member having symmetrical truncated ends; and
   (b) energy transmitting means for imposing on said cycling and energy absorbing means a deformation and its reverse deformation in response to mechanical energy applied thereto; said cycling and energy absorbing means being adapted to convert unidirectional mechanical energy applied to said energy transmitting means into its cyclic plastic deformation and reverse deformation.

2. A lightweight, high-energy device adapted to absorb unidirectional mechanical energy by cyclic plastic deformation, comprising:
   (a) a non-elastomeric toroidal cycling and energy absorbing means comprising at least two cylindrical members each having symmetrical truncated ends, said cylindrical members being attached together at their adjacent ends by a flexible joint means; and
   (b) energy transmitting means for imposing on said cycling and energy absorbing means a deformation and its reverse deformation in response to mechanical energy applied thereto; said cycling and energy absorbing means being adapted to convert unidirectional mechanical energy applied to said energy transmitting means into its cyclic plastic deformation and reverse deformation.

3. A lightweight, high-energy absorbing device adapted to absorb unidirectional mechanical energy by cyclic plastic deformation, comprising:
   (a) a cycling and energy absorbing means comprising at least a section of a non-elastomeric, toroidal member; and
   (b) energy transmitting means for imposing on said cycling and energy absorbing means a deformation and its reverse deformation in response to mechanical energy applied thereto; said cycling and energy absorbing means being adapted to convert unidirection mechanical energy applied to said energy transmitting means into its cyclic plastic deformation and reverse deformation, said energy transmitting means comprising:
      (I) column means movable and coaxial with respect to said toroidal member;
      (II) connecting means between said column means and said toroidal member for rotating said toroidal member by movement of said column means, said connecting means comprising:
         (aa) a series of pinion gears mounted coaxially on and spaced around said toroidal member and a series of corresponding racks mounted on and spaced around said column means, each of said racks being engaged with its corresponding pinion gear; and
      (III) support means for holding said toroidal member and maintaining the alignment of said column means therewith.

4. A lightweight, high-energy absorbing device adapted to absorb unidirectional mechanical energy by cyclic plastic deformation, comprising:
   (a) a cycling and energy absorbing means comprising at least a section of a non-elastomeric, toroidal member; and
   (b) energy transmitting means for imposing on said cycling and energy absorbing means a deformation and its reverse deformation in response to mechanical energy applied thereto; said cycling and energy absorbing means being adapted to convert unidirectional mechanical energy applied to said energy transmitting means into its cyclic plastic deformation and reverse deformation, said energy transmitting means comprising:

(I) column means movable and coaxial with respect to said toroidal member;

(II) connecting means between said column means and said toroidal member for rotating said toroidal member by movement of said column means; and (c) support means for holding said toroidal member and maintaining the alignment of said column means therewith, said connecting means comprising:

(aa) ridges provided on said toroidal member and grooves provided on said column means and said support means, said ridges being mutually engaged with said grooves.

5. A lightweight, high-energy absorbing device adapted to absorb unidirectional mechanical energy by cyclic deformation, comprising: a pair of relatively movable members having spaced apart opposed surfaces defining a substantially circular annular space therebetween; means guiding said members for relative movement only in the direction of the axis of said annular space and maintaining the width of said space substantially constant; a metal toroidal body positioned in said annular space and extending therearound; and means drivingly connecting said toroidal body to said relatively movable members so that relative movement between said members, in one direction along said axis causes said toroidal body to rotate in one direction about a second axis extending circumferentially of and within sad annular space whereby material of said body is cyclically deformed in opposite directions.

6. A lightweight, high-energy absorbing device adapted to absorb unidirectional mechanical energy by cyclic deformation, comprising: a pair of relatively movable members having spaced apart opposed surfaces defining a substantially circular annular space therebetween; means guiding said members for relative movement only in the direction of the axis of said annular space and maintaining the width of said space substantially constant; a metal toroidal body positioned in said annular space and extending therearound; and means drivingly connecting said toroidal body to said relatively movable members so that relative movement between said members, in one direction along said axis causes said toroidal body to rotate in one direction about a second axis extending circumferentially of and within said annular space whereby material of said body is cyclically deformed in opposite directions; said relatively movable members comprising, respectively, a generally straight cylindrical column and a generally annular member telescopically embracing said column.

7. A device as defined in claim 6 wherein said means drivingly connecting said body to said members comprises a plurality of elongated flexible filaments, each having its end secured to said column and an intermediate portion of each wound around said toroidal member.

8. A device as defined in claim 6 wherein said toroidal body is in frictional engagement with at least one of said opposed surfaces, said means drivingly connecting said body to said members including the frictionally engaged portions of said body and said one surface.

9. A lightweight, high-energy absorbing device adapted to absorb unidirectional mechanical energy by cyclic plastic deformation, comprising:

(a) a non-elastomeric cycling and energy absorbing means comprising a series of cylindrical members, each of said cylindrical members having symmetrical truncated ends, said cylindrical members being connected together to form a substantially toroidal member; and (b) energy transmitting means for imposing on said cycling and energy absorbing means a deformation and its reverse deformation in response to mechanical energy applied thereto, said cycling and energy absorbing means being adapted to convert unidirectional mechanical energy applied to said energy transmitting means into its cyclic plastic deformation and reverse deformation.

References Cited by the Examiner

UNITED STATES PATENTS 3,031,034 4/1962 Thomas _____ 188—1
3,087,584 4/1963 Jackson et al. _____ 188—1

DUANE A. REGER, ARTHUR L. LA POINT,
*Examiners.*